United States Patent
Lin et al.

(10) Patent No.: US 7,693,371 B1
(45) Date of Patent: Apr. 6, 2010

(54) OPTICAL WAVEGUIDE HAVING CHIRP GRATING FOR HIGH CONVERSION EFFICIENCY

(75) Inventors: Shih-Chiang Lin, Dashu Township (TW); Nai-Hsiang Sun, Dashu Township (TW)

(73) Assignee: I Shou University, Dashu Township (TW)

( * ) Notice: Subject to any disclaimer, the term of this patent is extended or adjusted under 35 U.S.C. 154(b) by 0 days.

(21) Appl. No.: 12/386,296

(22) Filed: Apr. 15, 2009

(30) Foreign Application Priority Data

Nov. 5, 2008 (TW) ............................... 97142661 A

(51) Int. Cl.
G02B 6/34 (2006.01)
G02B 5/18 (2006.01)
G02B 27/44 (2006.01)
G02F 1/295 (2006.01)
H04J 14/02 (2006.01)

(52) U.S. Cl. ...................... 385/37; 385/10; 359/566; 398/87

(58) Field of Classification Search .................. 385/37, 385/10; 359/566; 398/87
See application file for complete search history.

(56) References Cited

U.S. PATENT DOCUMENTS 6,321,015 B1 * 11/2001 Doran et al. ................. 385/123

2004/0081398 A1 * 4/2004 Jette et al. ..................... 385/37

OTHER PUBLICATIONS

Arbore, M.A., et al., "Pulse compression during second-harmonic generation in aperiodic quasi-phase-matching gratings," *Optics Letters*, vol. 22, No. 12, pp. 865-867 (Jun. 15, 1997).
Galvanauskas, A., et al., "Chirped-pulse-amplification circuits for fiber amplifiers, based on chirped-period quasi-phase matching gratings," *Optics Letters*, vol. 23, No. 21, pp. 1695-1697 (Nov. 1, 1998).
Bang, Ole, et al., "Engineering competing nonlinearities," *Optics Letters*, vol. 24, No. 20, pp. 1413-1415 (Oct. 15, 1999).
Kartaloglu, Tolga, et al., "Simultaneous phase matching of optical parametric oscillation and second-harmonic generation in aperiodically poled lithium niobate" *Optical Society of America*, vol. 20, No. 2, pp. 343-350 (Feb. 2003).

(Continued)

*Primary Examiner*—Frank G Font
*Assistant Examiner*—Jerry Blevins
(74) *Attorney, Agent, or Firm*—Townsend and Townsend and Crew, LLP

(57) ABSTRACT

A chirp optical waveguide includes a chirp grating formed in a ferroelectric substrate, and a waveguide part orthogonal to the chirp grating. The chirp grating has a plurality of grating segments and has a normalized grating period $\Lambda x/\Lambda_0$ that increases exponentially in each grating segment and decreases stepwise from each grating segment to a following one of the grating segments, where $\Lambda_0$ is an initial grating period at the wave propagation distance of zero, and $\Lambda x$ is a grating period at the wave propagation distance of x. The chirp grating provides high wave conversion efficiency for short pulse widths and effectively compensates for a reduction in conversion efficiency due to chromatic dispersion.

3 Claims, 9 Drawing Sheets

OTHER PUBLICATIONS

Gao, Shiming, et al., "Flat Broad-Band Wavelength Conversion Based on Sinusoidally Chirped Optical Superlattices in Lithium Niobate," *IEEE Photonics Technology Letters,* vol. 16, No. 2, pp. 557-559 (Feb. 2004).

Lin, Shih-Chiang, et al., "Enhanced Cascade $\chi^{(2)}$ SHG+DFG Interactions Based on Chirp Period Quasi-Phase-Matched Waveguide " *Optical Society of America,* pp. 1-2 (2007).

* cited by examiner

OPTICAL WAVEGUIDE HAVING CHIRP GRATING FOR HIGH CONVERSION EFFICIENCY

CROSS-REFERENCE TO RELATED APPLICATION

This application claims priority to Taiwanese Application No. 097142661, filed Nov. 5, 2008, the disclosure of which is incorporated herein by reference.

BACKGROUND OF THE INVENTION

1. Field of the Invention

The invention relates to an optical waveguide, more particularly, to an optical waveguide made from a ferroelectric material and having a chirp grating capable of providing high wavelength conversion efficiency.

2. Description of the Related Art

Referring to FIG. 1, a typical quasi-phase matched optical waveguide 1 includes a substrate 11 made from a ferroelectric material, such as $LiNbO_3$.

To fabricate the waveguide 1, an aluminum grating pattern 12 is deposited on a first surface 111 of the substrate 11 through a suitable technique such as vacuum vapor deposition. The aluminum grating pattern 12 includes a plurality of parallel aluminum strips having the same width. A photoresist 13 is present in the gaps between the aluminum strips. The first surface 111 and the aluminum grating pattern 12 are covered by a conductive liquid layer 14, such as a LiCl liquid layer. The second surface 112 of the substrate 11 is covered by another conductive liquid layer 14'.

When an electric field is applied to the conductive liquid layers 14, 14', regions of the substrate 11 beneath the contact surface areas of the first surface 111 and the aluminum grating pattern 12 are affected by the electric field and become domain-inverted regions which are referred to as first polarization parts 113. Regions of the substrate 11 beneath the contact surface areas of the first surface 111 and the photoresist 13 are not affected by the electric field. These regions are referred to as second polarization parts 114 hereinafter. A quasi-phase-matched periodic grating 116 (FIG. 2) composed of the first and second polarization parts 113, 114 is thus formed. When the electric field intensity is decreased slowly, the polarity of the first polarization parts 113 does not change any more.

Referring to FIG. 2, when the polarization of the substrate 11 becomes stable, the electric field, the aluminum grating pattern 12, the photoresist 13 and the conductive liquid layers 14, 14' are removed, and the first surface 111 is covered with a mask 9 containing chromium. A middle part of the mask 9 has a first shield portion 91 with a width (W), and the remaining parts are second shield portions 92. Only the second shield portions 92 are plated with chromium. When the substrate 11 together with the mask 9 is dipped into a benzoic acid solution at a temperature of 200° C. for one hour, parts of the substrate 11 covered by the second shield portions 92 do not react with the benzoic acid solution. However, the part of the substrate 11 covered by the first shield portion 91 undergoes a proton-exchange reaction with the benzoic acid solution as follows:

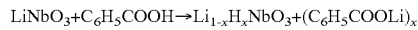

$LiNbO_3 + C_6H_5COOH \rightarrow Li_{1-x}H_xNbO_3 + (C_6H_5COOLi)_x$

After reaction, the part of the substrate 11 covered by the first shield portion 91 of the mask 9 is formed into a waveguide part 18 which is parallel to the periodic grating 116 formed on the substrate 11. The mask 9 is then removed, and the substrate 11 is annealed slowly at 450° C. for about one hour. The resulting waveguide part 18 has an inner surface with a refractive index up to 0.1-0.15 which is higher than that of the remaining parts of the substrate 11.

As the aluminum strips of the aluminum grating pattern 12 are equal in width, the first polarization parts 113 have the same width. Further, since the aluminum strips are equally spaced apart from each other, the second polarization parts 114 also have the same width. Therefore, the waveguide 1 has a uniform grating period $\Lambda_0$ which is the sum of the width of one first polarization part 113 and the width of one second polarization 114.

When a light signal is launched into the quasi-phase matched period grating 116 of the waveguide 1, by properly adjusting the incident angle of the light signal, the light signal can be transmitted by reflection through the waveguide part 18. As the light signal passes through the waveguide part 18, it produces a second harmonic wave which interacts with a new signal wave (a coupling component) to generate a conversion wave.

FIG. 3A shows plots (A) and (B) which were obtained by launching a signal wave with a pulse width of 6 picoseconds into the waveguide 1 having a uniform grating period ($\Lambda_0$=14.754 μm). Chromatic dispersion of lithium niobate is not taken into consideration in plot (A) (i.e., refractive index is 1). Plot (B) takes into consideration the chromatic dispersion. Plot (B) which is close to plot (A) demonstrates that the wavelength conversion energy of plot (B) does not reduce much compared to that of plot (A) for the pulse width of 6 picoseconds.

However, referring to FIG. 3B, when the pulse width is reduced to 0.6 picosecond, plot (B) which takes into consideration chromatic dispersion shows that the wavelength conversion energy is reduced to nearly zero. The reduction of the wavelength conversion efficiency is due to a phenomenon of back conversion resulting from the chromatic dispersion of the substrate 11. The conversion efficiency reduction becomes serious when the pulse width of a launched signal wave is decreased in order to increase the speed of an optical system.

The phenomenon of back conversion is affirmed by the inventor of this application in Shih-Chiang Lin, "Enhanced Cascade $X^{(2)}$ SHG+DFG Interactions Based on Chirp Period Quasi-Phase-Matched Waveguide," Conference on Lasers and Electro-Optics (CLEO), 2007. In order to increase the wavelength conversion energy, a chirp waveguide to retard and alter the relative phase accumulation is proposed in this reference. The chirp waveguide enhances the conversion efficiency up to 170%, and has a normalized grating period which increases exponentially and decreases stepwise in an alternating fashion. However, as the propagation distance increases, the normalized grating period varies non-exponentially as shown in FIG. 4.

Ole Bang, Carl Balslev Clausen, Peter L. Christiansen and L. Torner, "Engineering Competing Nonlinearities," Opt. Lett., Vol 24, pp. 1413-1415, 1999, discloses a chirped quasi-phase matched waveguide having a chirped grating which satisfies the following equation:

$$\Lambda(x)/\Lambda_0 = 1.0026 - 0.0026 \cdot \sin(K_2 \cdot x) \tag{1}$$

where $\Lambda(x)/\Lambda_0$ denotes a normalized grating period, $\Lambda_0$ is a grating period at a propagation distance of zero, $\Lambda(x)$ is a grating period at a propagation distance of (x), and $K_2$ is $1.1 \times 10^3$ (1/m). The normalized grating period designed by Ole Bang et al varies sinusoidally.

SUMMARY OF THE INVENTION

An object of the present invention is to provide an optical waveguide with a novel chirp grating that can provide an enhanced conversion efficiency for relatively short pulse widths.

Another object of the present invention is to provide an optical waveguide with a novel chirp grating having a normalized grating period which increases exponentially and decreases stepwise in an alternating fashion throughout the length of the optical waveguide.

According to the present invention, a chirp optical waveguide comprises a substrate of ferroelectric material having a chirp grating and a waveguide part. The chirp grating includes a plurality of grating segments arranged serially in a light propagation direction. The number of the grating segments is larger than two. Each of the grating segments has a normalized grating period $\Lambda x/\Lambda_0$ that increases exponentially and decreases stepwise in an alternating fashion as a wave propagation distance increases, where $\Lambda_0$ is an initial grating period at the wave propagation distance of zero, and $\Lambda x$ is a grating period at the wave propagation distance of x.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENTS

Figure 5:
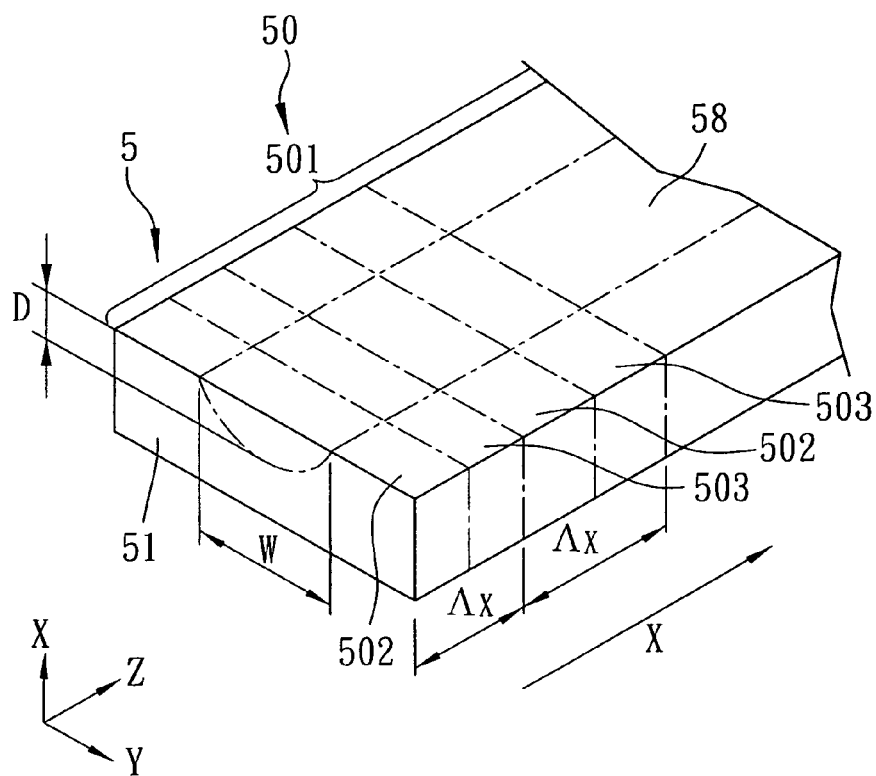
FIG. 5 is a fragmentary perspective view of an optical waveguide according to the present invention.
Figure 6:
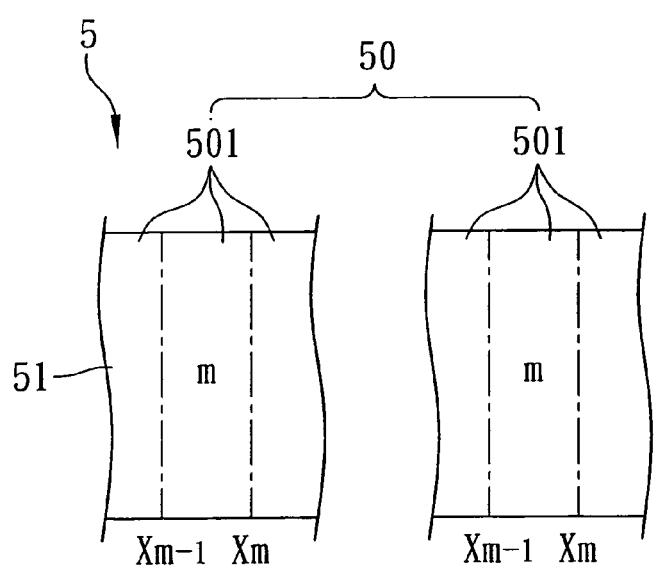
FIG. 6 is a sectional view showing a portion of the optical waveguide of FIG. 5.

Referring to FIGS. 5 and 6, a chirp optical waveguide 5 embodying the present invention includes a ferroelectric substrate 51 formed with a chirp grating 50 and a waveguide part 58. The chirp grating 50 has a plurality of grating segments 501 each of which has a chirp grating period $\Lambda x$ that varies as a function of wave propagation distance (x). The waveguide part 58 has a depth (D) and a width (W) and is parallel to the chirp grating 50.

The substrate 51 is made of a ferroelectric material capable of polarization inversion. Useful ferroelectric materials for the substrate 51 may be $LiNbO_3$, $LiTaO_3$, GaAs, phosphates such as $KTiOPO_4$, $RbTiOPO_4$, $RbTiAsPO_4$, and $KH_2PO_4$, borates, such as $BaB_2O_4$ and $C_5B_3O_5$, and $KTiOAsO_4$. In a preferred embodiment, $LiNbO_3$ is used.

Figure 1:
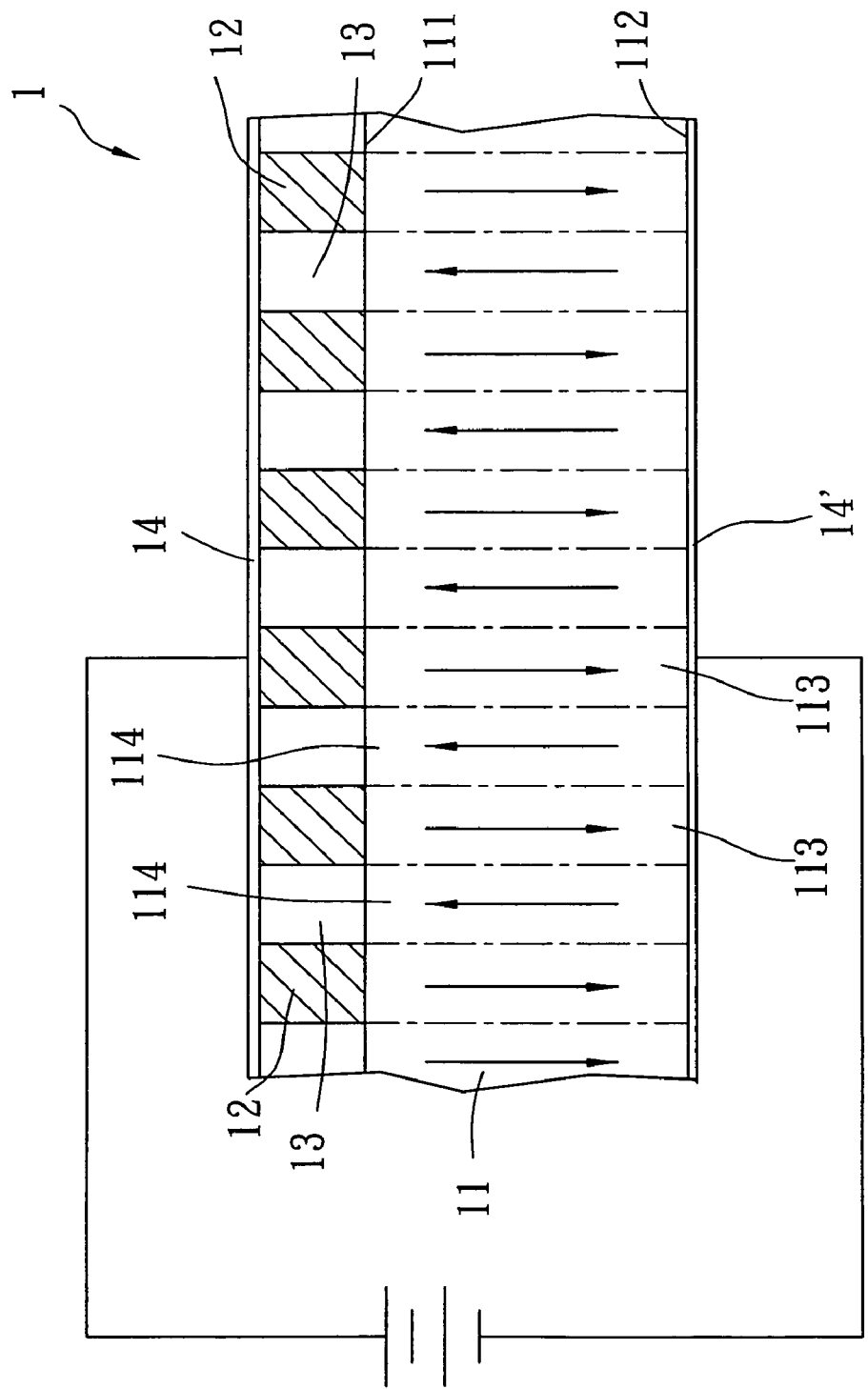
FIG. 1 is a fragmentary sectional view illustrating a conventional process for forming a grating on a substrate of ferroelectric material using a grating pattern.
Figure 2:
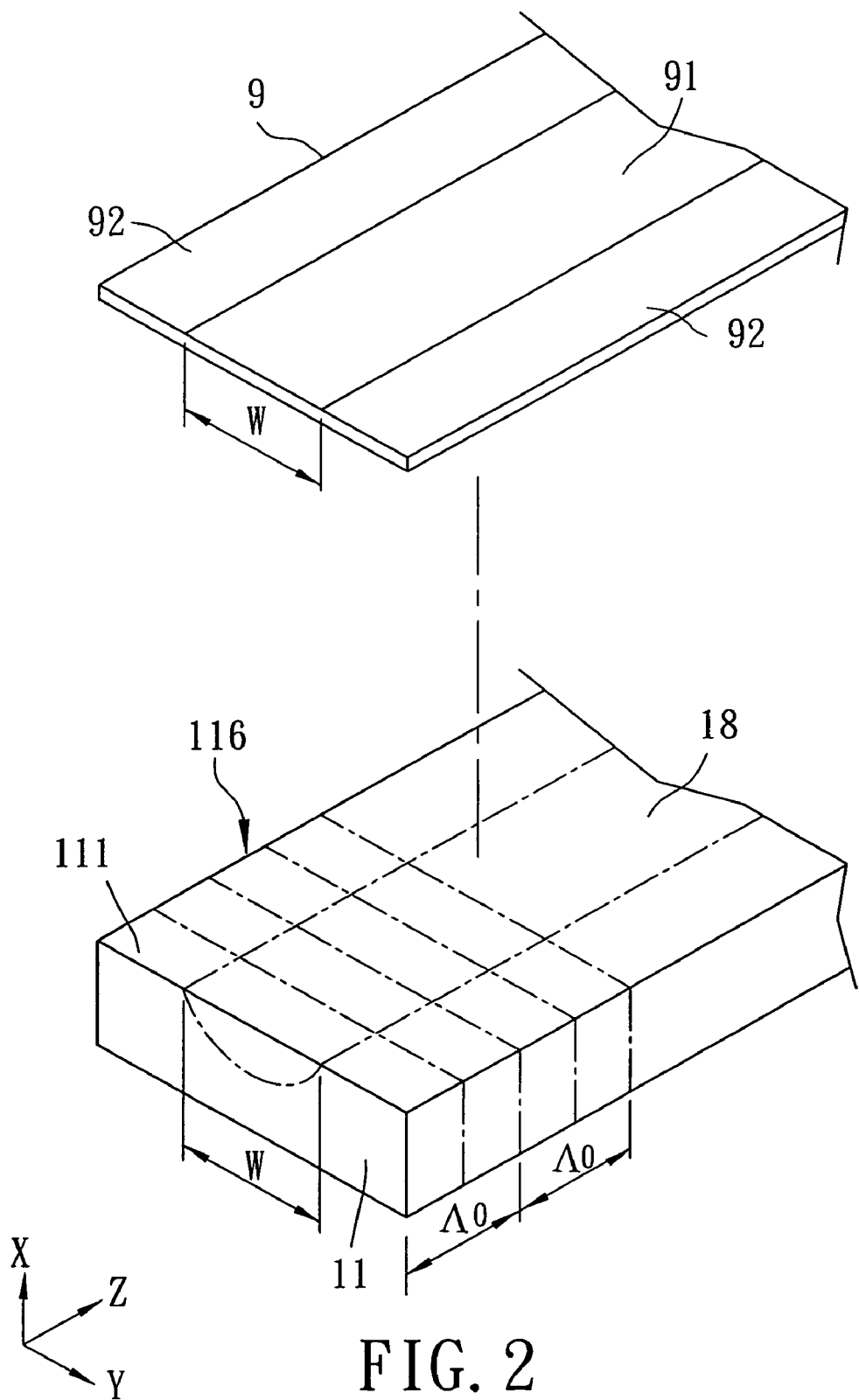
FIG. 2 shows that a waveguide part is formed on the substrate of FIG. 1.
Figure 3A:
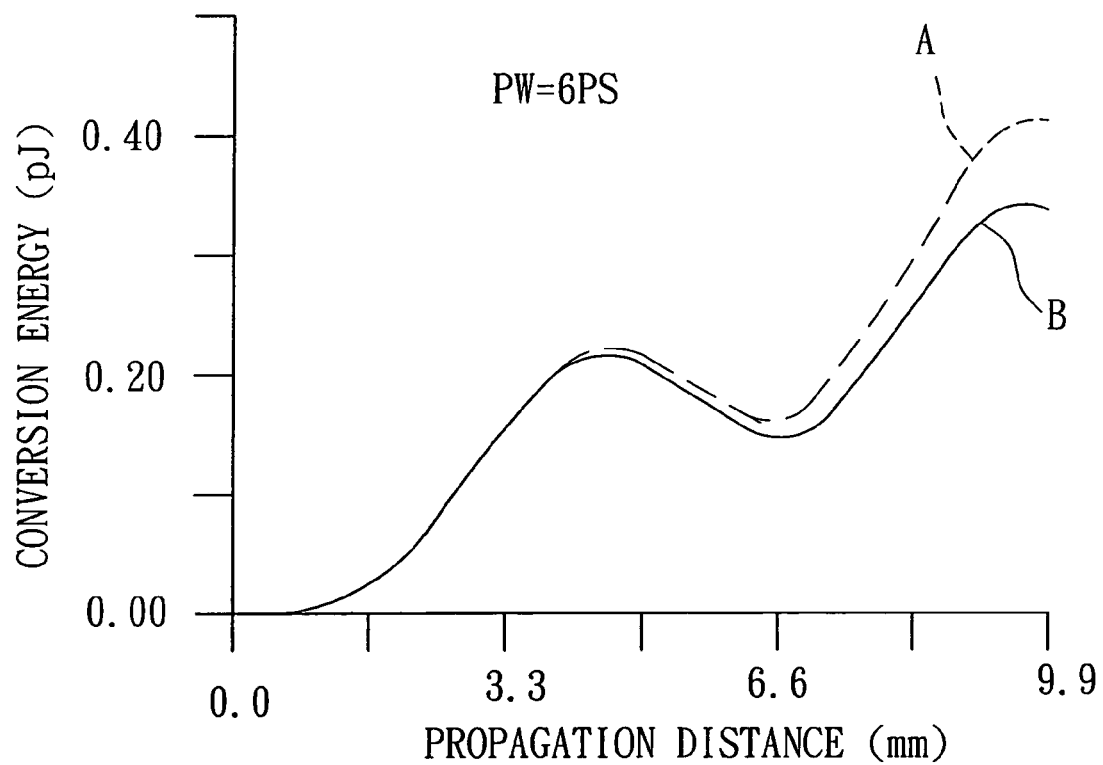
FIG. 3A shows the distributions of conversion energies as a function of propagation distance for a single wave with a pulse width of 6 ps launched in a conventional uniform grating.
Figure 3B:
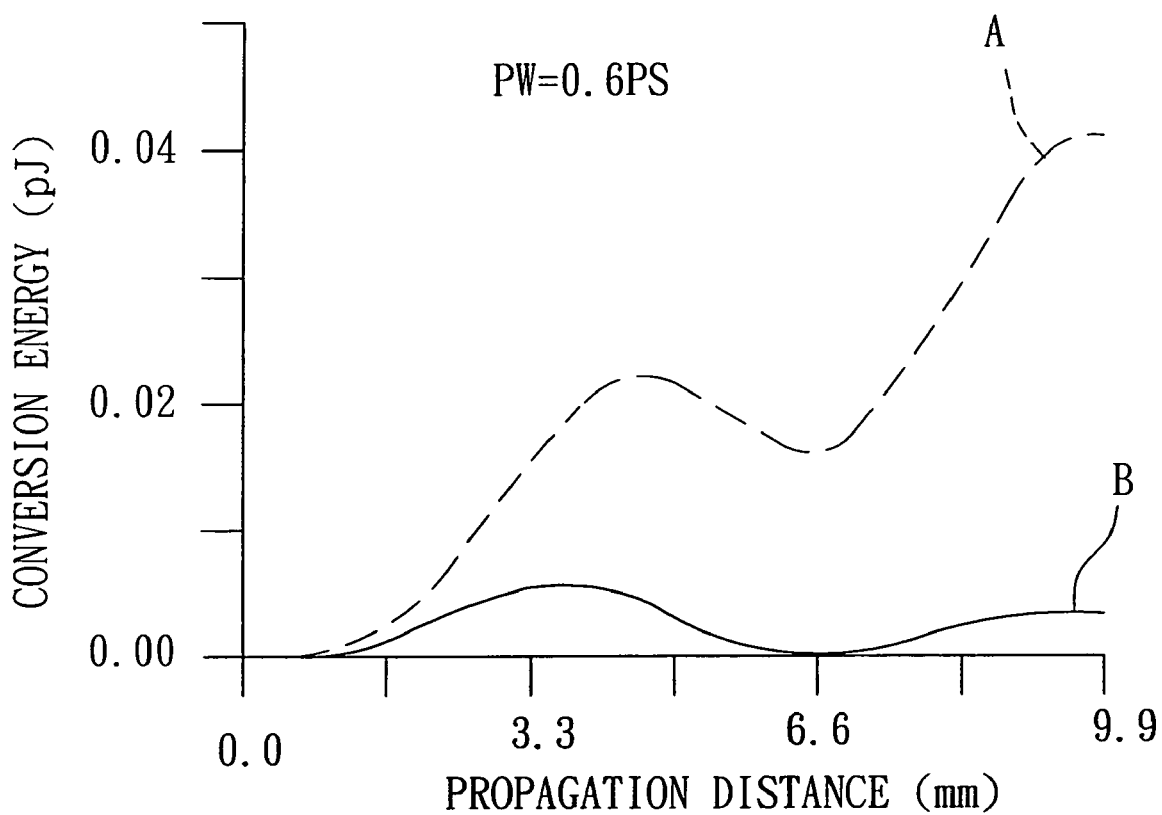
FIG. 3B shows the distributions of conversion energies as a function of propagation distance for a pulse width of 0.6 ps launched in the conventional uniform grating.

The chirp grating 50 and the waveguide part 58 may be formed on the substrate 51 by a suitable conventional method of fabricating ferroelectric waveguides. For example, the conventional fabrication method described hereinbefore with reference to FIGS. 1 and 2 may be employed to fabricate the chirp grating 50 and the waveguide part 58 of the present invention. However, the metal grating pattern used for the present invention should be designed according to the chirp grating period $\Lambda x$ of the grating 50.

As best shown in FIG. 6, each grating segment 501 has alternating first polarization parts 502 (domain-inverted regions) and second polarization parts 503. The chirp grating period $\Lambda x$ is the sum of the width of one first polarization part 502 and the width of one second polarization part 503. The width of the first polarization part 502 is equal to the width of the second polarization part 503 in each grating period $\Lambda x$. The grating 50 is designed in such a manner that the normalized grating period ($\Lambda x/\Lambda_0$) of the grating 50 satisfies the following equation:

$$\Lambda x/\Lambda_0 = k_m + \Delta S_m \cdot \exp\{-[(x-x'_m)/Q]\} \qquad (2)$$

where x is the wave propagation distance, $x_{m-1} < x \leq x_m$, m is the index number of each grating segment 501, $x_{m-1}$ and $x_m$ are positions of upstream and downstream boundaries of each grating segment 501, $\Lambda x/\Lambda_0$ denotes the normalized grating period, $\Lambda x$ is the grating period at propagation distance x, $\Lambda_0$ is the initial grating period at propagation distance of zero, and Q, $k_m$, $\Delta S_m$ are design parameters.

Figure 7:
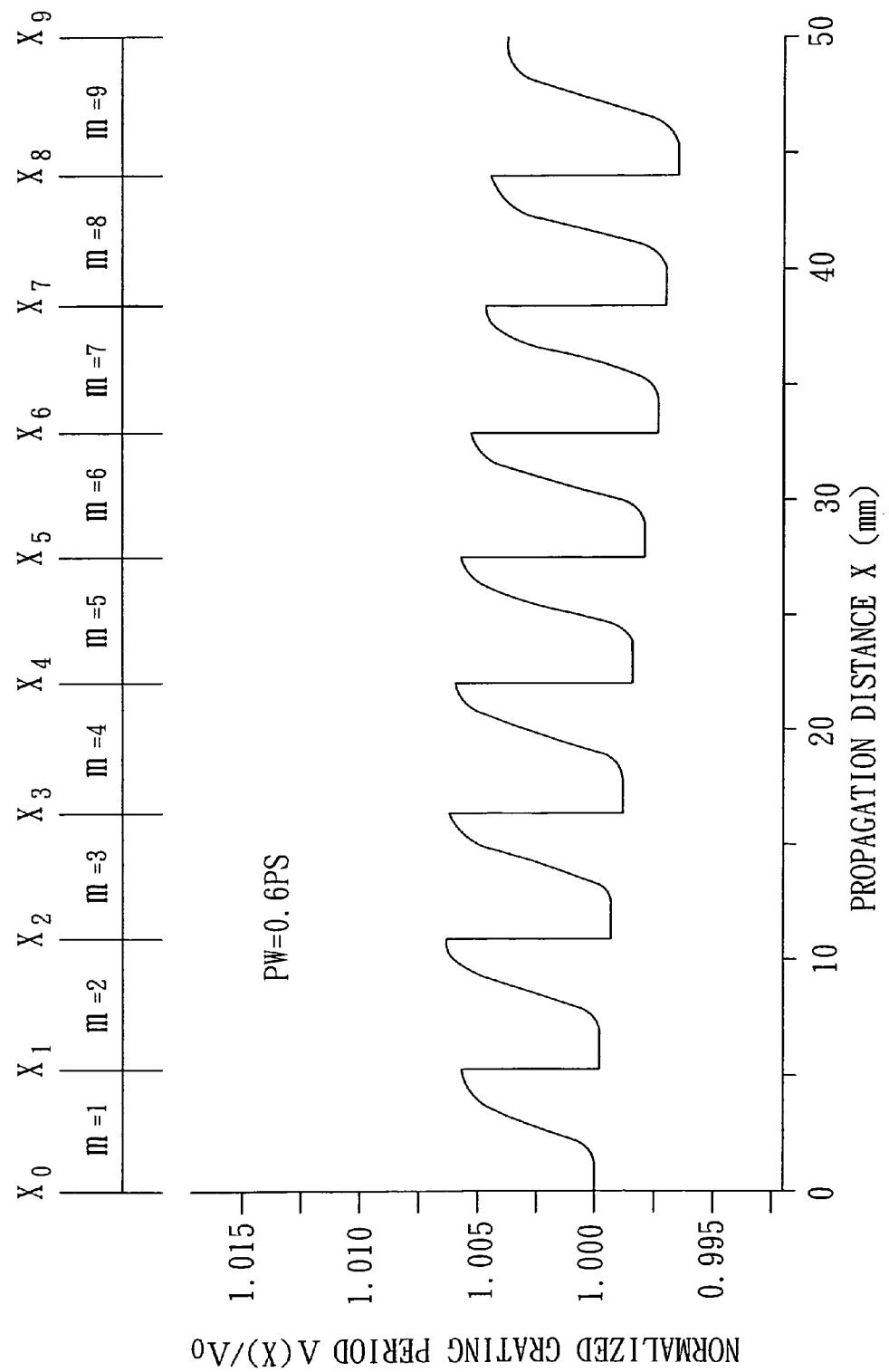
FIG. 7 shows a plot representing a normalized grating period of a grating used in the optical waveguide of FIG. 5.

The variation of the normalized grating period $\Lambda x/\Lambda_0$ of the grating 50 is regular, and the number of the grating segments 501 is larger than two. In each grating segment 501, the upstream boundary is at the position $x_{m-1}$, and the downstream boundary is at the position $x_m$. The downstream boundary of each grating segment 501 is at the same position (the same propagation distance) as the upstream boundary of a following one of the grating segments 501. Referring to FIG. 7 in combination with FIG. 5, in each grating segment 501, the normalized grating period $\Lambda(x)/\Lambda_0$ increases exponentially from an upstream normalized grating period at the upstream boundary of the corresponding grating segment 501. The normalized grating period $\Lambda(x)/\Lambda_0$ decreases stepwise from each grating segment 501 to the following one of the grating segments 501. The normalized grating periods at the upstream boundaries of nine grating segments 501 decrease from the initial grating period $\Lambda_0$ as the wave propagation distance increases.

The invention will be explained in more detail with reference to the following example.

Example

In this example, a chirp optical waveguide 5 was fabricated using lithium niobate as a substrate 51 and using the conventional method described hereinbefore with reference to FIGS.

1 and 2. The waveguide part 58 formed in the substrate 51 had a total length of about 50 mm, a width of 12 μm and a depth of 3 μm. The chirp grating 50 formed in the substrate 51 had nine grating segments 501.

The grating pattern used for fabricating the chirp optical waveguide 5 was designed such that the chirp grating period Λ(x) formed in the substrate 51 satisfied the equation (2). The plot shown in FIG. 7 represents the normalized gating period for nine grating segments 501 and for a launched pulse width of 0.6 ps. The plot demonstrates that the normalized grating period $\Lambda(x)/\Lambda_0$ increases exponentially in each grating segment 501 as the propagation distance is increased, and decreases stepwise from each grating segment 501 to the next grating segment 501. The initial grating period $\Lambda_0$ at the propagation distance zero was 14.754 μm. The values of the parameters $x_m$, $k_m$, $\Delta S_m$, $x'_m$ and Q of equation (2) for the nine grating segments 501 are provided in Table 1.

TABLE 1

| M | 1 | 2 | 3 | 4 | 5 | 6 | 7 | 8 | 9 |
|---|---|---|---|---|---|---|---|---|---|
| $x_m$ (mm) | 5.41 | 10.97 | 16.5 | 22.01 | 27.49 | 32.91 | 38.42 | 43.9 | 49.37 |
| $K_m$ | 1 | 0.9997 | 0.9993 | 0.9988 | 0.9983 | 0.9978 | 0.9973 | 0.9969 | 0.9965 |
| $\Delta S_m$ | 0.0056 | 0.0065 | 0.0068 | 0.007 | 0.0073 | 0.0073 | 0.0073 | 0.0073 | 0.0071 |
| $x'_m$ (mm) | 5.8 | 11.50 | 17.1 | 22.6 | 28.1 | 33.5 | 39.0 | 44.5 | 50.0 |
| Q (mm) | 3 | 3 | 3 | 3 | 3 | 3 | 3 | 3 | 3 |

Figure 4:
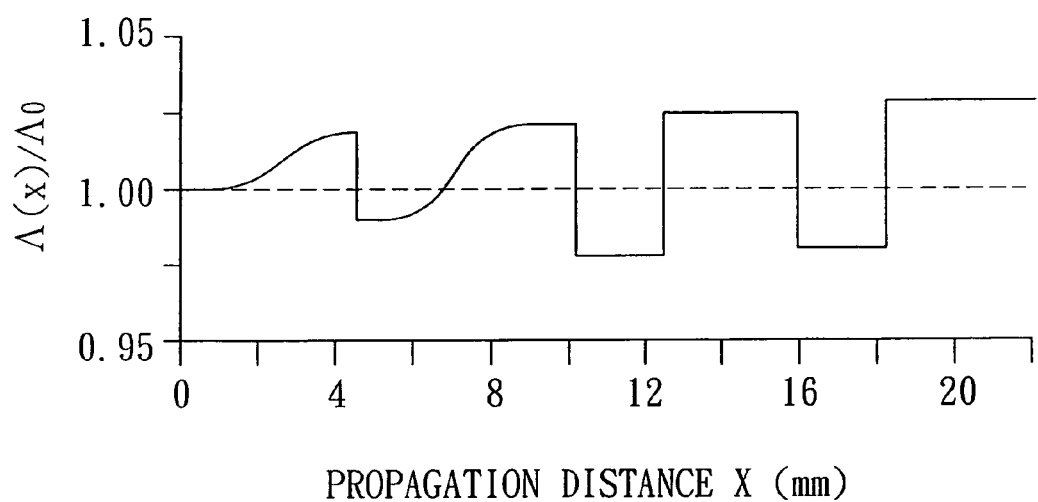
FIG. 4 shows a plot that represents a normalized grating period as a function of propagation distance for a conventional chirp grating.

Compared to the normalized grating period shown in FIG. 4 which increases non-exponentially from the third one of grating segments, the normalized grating period according to the present invention varies regularly for all nine grating segments 501.

According to equation (2) and according to the parameters provided in Table 1, when x is 10 mm, $x_{m-1}$ is 5.41 mm, $x_m$ is 10.97 mm, m is 2, $k_m$ is 0.9997, $\Delta S_m$ is 0.0065, and $x'_m$ is 11.5 mm. The resulting normalized grating period at the propagation distance of 10 mm is 1.0058. Hence, the chirp grating period Λ(x) of the grating 50 at 10 mm is longer than the initial grating period $\Lambda_0$ (14.754 μm) by 0.58%. When x is 30 mm, $x_{m-1}$ is 27.49 mm, $x_m$ is 32.97 mm, m is 6, $k_m$ is 0.9978, $\Delta S_m$ is 0.0073, and $x'_m$ is 33.5 mm. The resulting normalized grating period at the propagation distance of 30 mm is 0.9989. Hence, the chirp grating period Λ(x) at 30 mm is shorter than the initial grating period $\Lambda_0$ (14.754 μm) by 0.11%.

Figure 8:
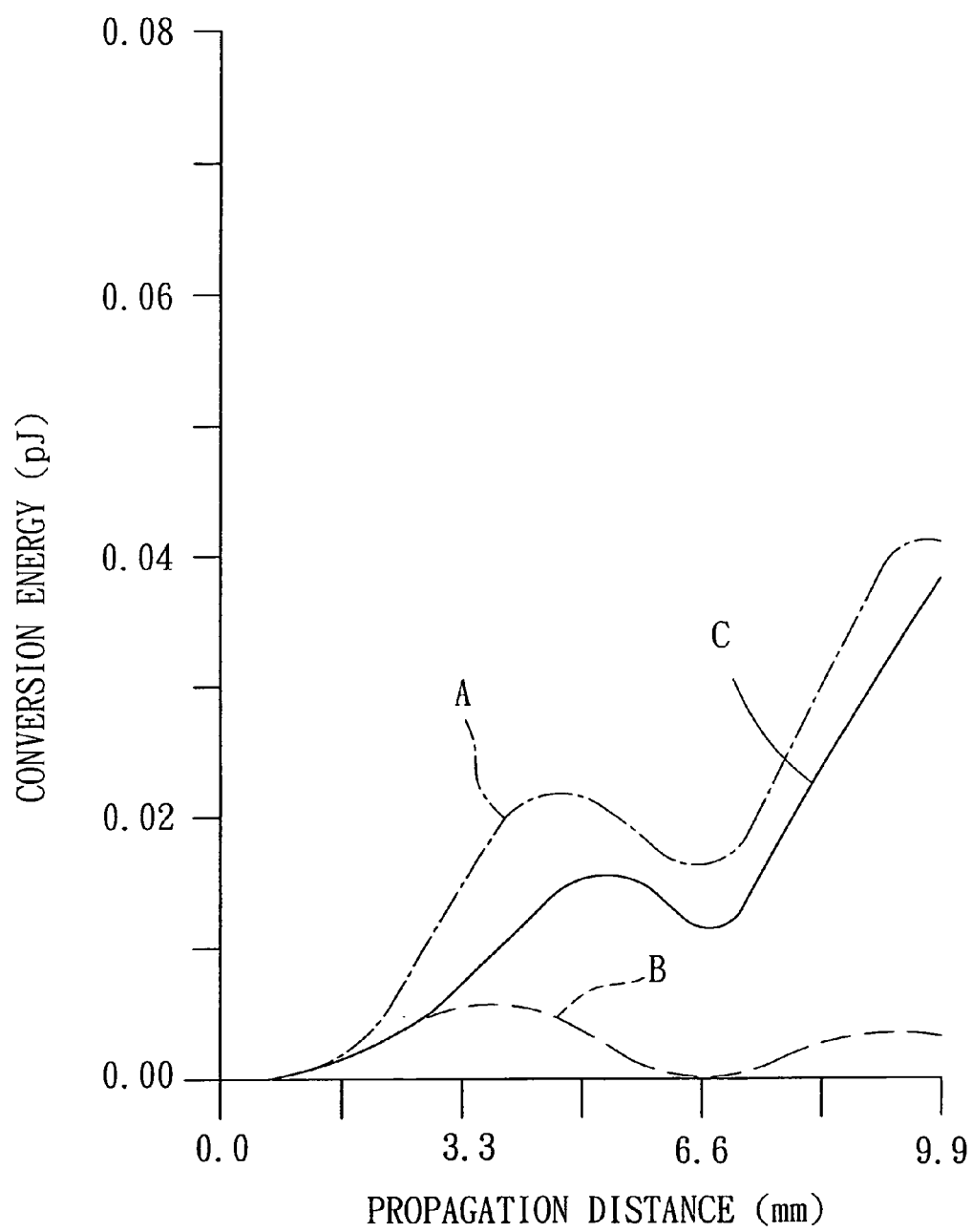
FIG. 8 shows the distributions of conversion energy produced with the chirp grating period according to the present invention and with a uniform grating period.

In FIG. 8, plots (A), (B) and (C) represent the distributions of conversion energy as a function of propagation distance for a pulse width of 0.6 ps. Plots (A) and (B) respectively represent the distributions of conversion energy involving chromatic dispersion for a uniform grating period (14.754 μm) and not involving chromatic dispersion for a uniform grating period, respectively. Plot (C) represents the distribution of the conversion energy with chromatic dispersion for the chirp grating period Λ(x) of the grating 50. Plot (B) shows that the conversion efficiency decreases significantly as the propagation distance increases. Plot (C) shows that the conversion efficiency of the chirp grating period Λx can be increased up to more than 2500% as the propagation distance increases. The chirp grating 50 can effectively compensate for the reduction in conversion efficiency due to chromatic dispersion.

Figure 9:
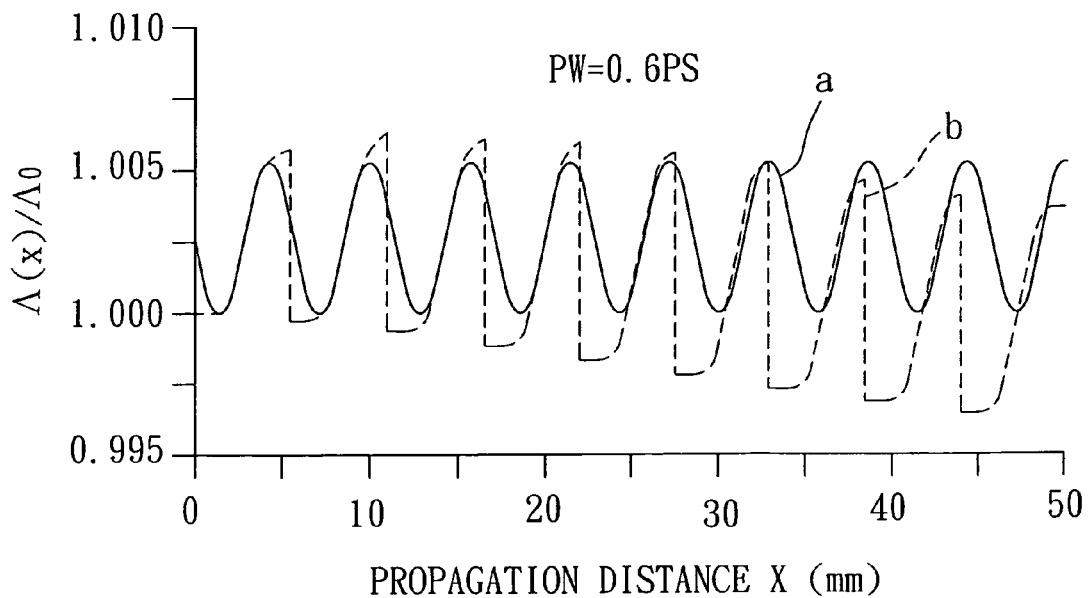
FIG. 9 shows the normalized grating period embodying the present invention and the normalized grating period proposed by Ole Bang et al.

Referring to FIG. 9, plots (a) and (b) represent the normalized grating periods that respectively satisfy equation (1) proposed by Ole Bang et al and equation (2) according to the present invention. Plot (a) shows that the normalized grating period of Ole Bang et al is sinusoidal, unlike the normalized grating period according to the present invention.

Figure 10:
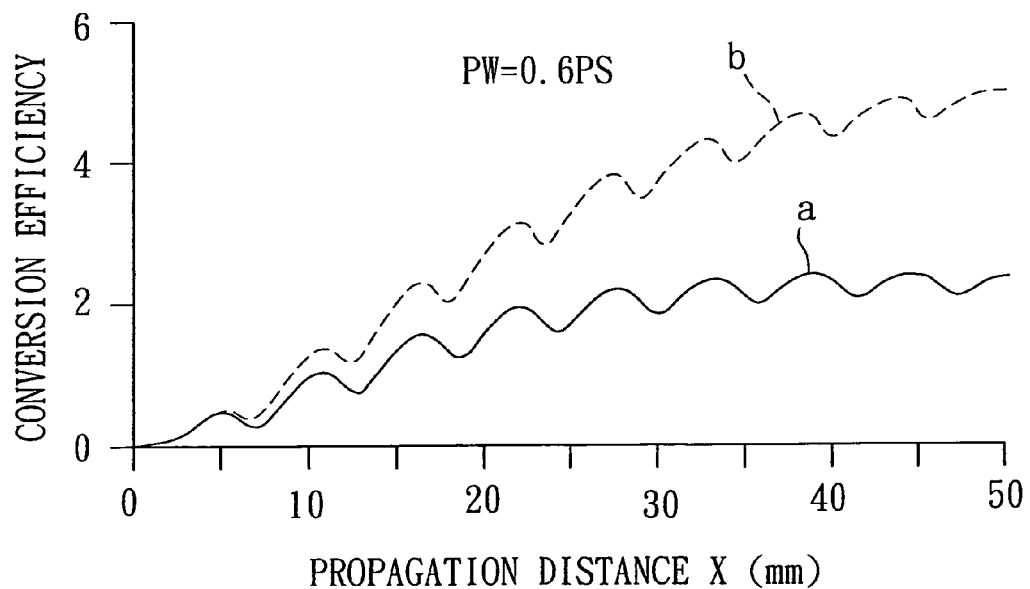
FIG. 10 shows the distributions of conversion energy produced with the chirp grating period according to the present invention and with the chirp grating period proposed by Ole Bang et al.

Referring to FIG. 10, plots (a) and (b) respectively represent the distributions of conversion efficiency for the grating of Ole Bang et al and for the grating 50 according to the present invention. FIG. 10 shows that the conversion efficiency is higher in plot (b) than in plot (a).

While the present invention has been described in connection with what is considered the most practical and preferred embodiments, it is understood that this invention is not limited to the disclosed embodiment but is intended to cover various arrangements included within the spirit and scope of the broadest interpretation so as to encompass all such modifications and equivalent arrangements.

What is claimed is:

1. A chirp optical waveguide comprising
a substrate of ferroelectric material having a chirp grating and a waveguide part,
said chirp grating including a plurality of grating segments arranged serially in a light propagation direction, the number of said grating segments being larger than two, said chirp grating having a normalized grating period $\Lambda x/\Lambda_0$ that increases exponentially in each of said grating segments as a wave propagation distance increases and decreases stepwise from each of said grating segments to a following one of said grating segments, where $\Lambda_0$ is an initial grating period at the wave propagation distance of zero, and Λx is a grating period at the wave propagation distance of x, wherein each of said grating segments has an upstream boundary, and a downstream boundary, said downstream boundary of each of said grating segments being at the same wave propagation distance as said upstream boundary of a following one of said grating segments, said normalized grating period increasing exponentially from said upstream boundary to said downstream boundary in each of said grating segments.

2. The chirp optical waveguide of claim 1, wherein said normalized grating periods at said upstream boundaries of said grating segments decrease from said initial grating period $\Lambda_0$ as the wave propagation distance increases.

3. The chirp optical waveguide of claim 2, wherein said wave guide part has a length of about 50 mm, and the number of said grating segments is nine.

* * * * *